(12) United States Patent
Noda et al.

(10) Patent No.: US 11,534,725 B2
(45) Date of Patent: Dec. 27, 2022

(54) ZEOLITE MEMBRANE COMPLEX AND METHOD OF PRODUCING ZEOLITE MEMBRANE COMPLEX

(71) Applicant: NGK INSULATORS, LTD., Nagoya (JP)

(72) Inventors: Kenichi Noda, Nagoya (JP); Aya Miura, Nagoya (JP); Ryotaro Yoshimura, Nagoya (JP); Takeshi Hagio, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 214 days.

(21) Appl. No.: 16/806,094

(22) Filed: Mar. 2, 2020

(65) Prior Publication Data

US 2020/0197879 A1    Jun. 25, 2020

Related U.S. Application Data

(63) Continuation of application No. PCT/JP2018/030696, filed on Aug. 20, 2018.

(30) Foreign Application Priority Data

Oct. 16, 2017  (JP) .............................. JP2017-200128

(51) Int. Cl.
*B01D 71/02* (2006.01)
*B01D 53/22* (2006.01)
(Continued)

(52) U.S. Cl.
CPC ......... *B01D 71/028* (2013.01); *B01D 53/228* (2013.01); *B01D 67/0051* (2013.01); *B01D 67/0058* (2013.01); *B01D 69/02* (2013.01); *B01D 69/10* (2013.01); *B01D 2323/48* (2013.01); *B01D 2325/02* (2013.01)

(58) Field of Classification Search
None
See application file for complete search history.

(56) References Cited

U.S. PATENT DOCUMENTS

2010/0298115 A1   11/2010   Yajima et al.
2011/0301017 A1   12/2011   Niino et al.
(Continued)

FOREIGN PATENT DOCUMENTS

WO   2009/113715 A1   9/2009
WO   2010/101035 A1   9/2010
(Continued)

OTHER PUBLICATIONS

Shenglai Zhong, et al., Aluminophosphate-17 and silicoaluminophosphate-17 membranes for CO2 separations, Journal of Membrane Science, vol. 520, 2016, pp. 507-514 (Year: 2016).*

(Continued)

*Primary Examiner* — Jason M Greene
*Assistant Examiner* — Eric J McCullough
(74) *Attorney, Agent, or Firm* — Burr & Brown, PLLC

(57) ABSTRACT

A zeolite membrane complex comprises: a support; and a zeolite membrane formed on the support. The membrane is of SAT-type zeolite, and in an X-ray diffraction pattern obtained by X-ray irradiation to the zeolite membrane, a peak intensity around $2\theta=13.9°$ is 1.5 times or more a peak intensity around $2\theta=8.5°$.

7 Claims, 1 Drawing Sheet

(51) Int. Cl.
  *B01D 67/00*   (2006.01)
  *B01D 69/02*   (2006.01)
  *B01D 69/10*   (2006.01)

(56) References Cited

U.S. PATENT DOCUMENTS

| | | |
|---|---|---|
| 2012/0183759 A1 | 7/2012 | Nakamura et al. |
| 2012/0272826 A1 | 11/2012 | Uchikawa et al. |
| 2015/0224451 A1 | 8/2015 | Miyahara et al. |
| 2017/0291135 A1 | 10/2017 | Noda |
| 2017/0296980 A1 | 10/2017 | Noda |

FOREIGN PATENT DOCUMENTS

| | | |
|---|---|---|
| WO | 2011/040205 A1 | 4/2011 |
| WO | 2011/105511 A1 | 9/2011 |
| WO | 2014/069676 A1 | 5/2014 |
| WO | 2016/121887 A1 | 8/2016 |
| WO | 2016/121889 A1 | 8/2016 |

OTHER PUBLICATIONS

Growth of Uniformly Oriented Silica MFI and BEA Zeolite Films on Substrates, Tung Cao Thanh Phamh et al., Science, Dec. 16, 2011, vol. 334, Issue 6062, pp. 1533-1538 (Year: 2011).*

English Translation of the International Preliminary Report on Patentability (Chapter I) (Application No. PCT/JP2018/030696) dated Apr. 30, 2020.

Graham W. Noble, et al., "The Templated Synthesis and Structure Determination by Synchrotron Microcrystal Diffraction of the Novel Small Pore Magnesium Aluminophosphate STA-2," *Journal of Chemical Society, Dalton Transactions*, 1997, pp. 4485-4490.

Maria Castro, et al., "Molecular Modeling, Multinuclear NMR, and Diffraction Studies in the Templated Synthesis and Characterization of the Aluminophosphate Molecular Sieve STA-2," *Journal of physics and Chemistry C*, 2010, vol. 114, pp. 12698-12710.

International Search Report and Written Opinion (Application No. PCT/JP2018/030696) dated Oct. 30, 2018.

\* cited by examiner

ZEOLITE MEMBRANE COMPLEX AND METHOD OF PRODUCING ZEOLITE MEMBRANE COMPLEX

The present application is a continuation application of International Application No. PCT/JP2018/030696, filed Aug. 20, 2018, which claims priority to Japanese Patent Application No. 2017-200128, filed Oct. 16, 2017. The contents of these applications are incorporated herein by reference in their entirety.

TECHNICAL FIELD

The present invention relates to a zeolite membrane complex in which a zeolite membrane is formed on a support.

BACKGROUND ART

Various structures of zeolites are known, and three letters of the alphabet are assigned as a code indicating each structure by the International Zeolite Association. One of the structures of zeolites is an SAT-type structure. With respect to SAT-type zeolites, for example, Non-Patent Documents 1 and 2 disclose the methods for synthesis of SAT-type zeolite powder.

Meanwhile, various studies and developments are underway on forming zeolite in membrane form on a support and using the zeolite membrane in applications such as specific gas separation or molecular adsorption. With respect to SAT-type zeolites, in sample No. 4 of an example of Patent Document 1, zeolite powder synthesized by the method of Non-Patent Document 1 is applied on the outer surface of a porous alumina substrate, and the substrate is immersed in a synthesis sol used in the synthesis of the zeolite powder so that a zeolite membrane is formed by hydrothermal synthesis.

PRIOR ART DOCUMENTS

Patent Document

Patent Document 1: International Publication WO2016/121889

Non-Patent Documents

Non-Patent Document 1: "The templated synthesis and structure determination by synchrotron microcrystal diffraction of the novel small pore magnesium aluminophosphate STA-2" by Graham W. Noble and other two members, Journal of Chemical Society, Dalton Transactions 1997, pp. 4485-4490.

Non-Patent Document 2: "Molecular Modeling, Multinuclear NMR, and Diffraction Studies in the Templated Synthesis and Characterization of the Aluminophosphate Molecular Sieve STA-2" by Maria Castro and other ten members, Journal of Physics and Chemistry C 2010, volume 114, pp. 12698-12710.

SUMMARY OF INVENTION

Problems to be Solved by Invention

Incidentally, in the case where an SAT-type zeolite membrane complex is produced by the technique of Non-Patent Document 1, the zeolite membrane is not oriented. Thus, it is difficult to achieve high performance as a gas separation membrane, for instance. The same can be said of other applications using a zeolite membrane for molecule permeation or adsorption.

The present invention is made in view of the above-described problems, and it is an object of the present invention to provide a new SAT-type zeolite membrane complex adequate for various applications.

A zeolite membrane complex according to a preferable aspect of the present invention includes a support and a zeolite membrane formed on the support. The zeolite membrane is of SAT-type zeolite. In an X-ray diffraction pattern obtained by X-ray irradiation to the zeolite membrane, a peak intensity around $2\theta=13.9°$ is 1.5 times or more a peak intensity around $2\theta=8.5°$.

Preferably, in the X-ray diffraction pattern, the peak intensity around $2\theta=13.9°$ is two times or more the peak intensity around $2\theta=8.5°$.

Preferably, the support is porous. More preferably, the support is an alumina sintered compact or a mullite sintered compact.

The present invention is also intended for a method of producing a zeolite membrane complex. The method of producing a zeolite membrane complex according to a preferable aspect of the present invention includes a) synthesizing SAT-type zeolite by hydrothermal synthesis and obtaining seed crystals from the zeolite, b) depositing the seed crystals on a support, c) immersing the support in a starting material solution having a pH greater than or equal to 5 and less than or equal to 9 prepared by mixing an aluminum source and a phosphorus source with a pH greater than or equal to 4, and growing SAT-type zeolite from the seed crystals by hydrothermal synthesis to form a zeolite membrane on the support, and d) removing a structure-directing agent from the zeolite membrane.

Preferably, in an X-ray diffraction pattern obtained by X-ray irradiation to the zeolite membrane, a peak intensity around $2\theta=13.9°$ is 1.5 times or more a peak intensity around $2\theta=8.5°$.

Also, preferably, in the operation a) or c), aluminum alkoxide or an alumina sol is used as the aluminum source in the hydrothermal synthesis.

Effects of Invention

According to the present invention, it is possible to provide a new SAT-type zeolite membrane complex.

DESCRIPTION OF EMBODIMENTS

Figure 1:
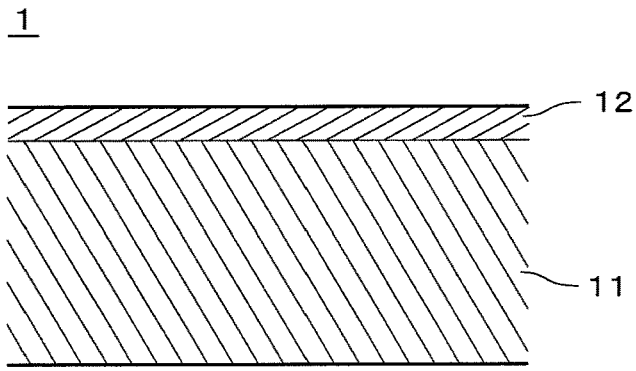
FIG. 1 is a sectional view of a zeolite membrane complex.

FIG. 1 is a sectional view of a zeolite membrane complex 1 according to an embodiment of the present invention. The zeolite membrane complex 1 includes a support 11 and a zeolite membrane 12 formed on the support 11. In FIG. 1, the thickness of the zeolite membrane 12 is illustrated greater than the actual thickness. In the present embodiment, the support 11 is a porous member that passes gases, and the zeolite membrane 12 is a gas separation membrane. The zeolite membrane 12 may be used in other applications as a molecule separation membrane using a molecular sieving function. For example, the zeolite membrane 12 may also be used as a pervaporation membrane. The zeolite membrane complex 1 may also be used in other applications. The support 11 may be a member that does not pass gases.

Various materials can be adopted as the material for the support 11 as long as they have chemical stability in the step of forming the zeolite membrane 12 on the surface. Examples of the material for the support 11 include ceramic sintered compacts, metals, organic polymers, glass, and carbon. Examples of the ceramic sintered compacts include alumina, silica, mullite, zirconia, titania, yttria, silicon nitride, and silicon carbide. Examples of the metals include aluminum, iron, bronze, and stainless. Examples of the organic polymers include polyethylene, polypropylene, polytetrafluoroethylene, polysulfone, and polyimide.

The support 11 may contain an inorganic binder. As the inorganic binder, at least one of titania, mullite, easily sinterable alumina, silica, glass frits, clay minerals, and easily sinterable cordierite can be used.

FIG. 1 illustrates only part of the support 11, but for example, the support 11 as a whole has a shape such as a honeycomb shape, a monolithic shape, a flat plate-like shape, a tubular shape, a circular cylindrical shape, a circular columnar shape, or a prism shape. The support 11 has a length of, for example, 10 cm to 200 cm. The support 11 has an outer diameter of, for example, 0.5 cm to 30 cm. In the case where the support 11 has a monolithic shape, the distance between the central axes of adjacent through holes is, for example, in the range of 0.3 mm to 10 mm. In the case where the support 11 has a tubular shape or a flat plate-like shape, the support 11 has a thickness of, for example, 0.1 mm to 10 mm.

The support 11 has surface roughness (Ra) of, for example, 0.1 μm to 2.0 μm, and preferably 0.2 μm to 1.0 μm.

When the zeolite membrane 12 is used as a gas separation membrane, the support 11 is porous. In this case, the mean pore diameter of the support 11 in the vicinity of the surface on which the zeolite membrane 12 is formed is preferably smaller than the mean pore diameters in the other portions. To realize this structure, the support 11 has a multilayer structure. When the support 11 has a multilayer structure, the material for each layer may be any of the materials described above, and each layer may be formed of the same material, or may be formed of a different material. The mean pore diameter can be measured with an equipment such as a mercury porosimeter, a perm porometer, or a nano-perm porometer. The mean pore diameter of the support 11 in the vicinity of the surface on which the zeolite membrane 12 is formed is preferably in the range of 0.001 μm to 1 μm, and the porosity is preferably in the range of 20% to 60%. This structure is preferably provided within a range of 1 μm to 50 μm from the surface.

With respect to the pore diameter distribution of the support 11, D5 is in the range of, for example, 0.1 μm to 50 μm, D50 is in the range of, for example, 0.5 μm to 70 μm, and D95 is in the range of, for example, 10 μm to 2000 μm.

The zeolite membrane 12 preferably has a thickness of 0.1 μm to 10 μm. Increasing the thickness of the zeolite membrane 12 increases gas separation performance. Reducing the thickness of the zeolite membrane 12 increases the gas permeation.

The zeolite membrane 12 is a zeolite having an SAT structure. In other words, the zeolite membrane 12 is a zeolite with a framework type code "SAT." The SAT-type zeolite is an aluminophosphate (AlPO)-based zeolite composed of at least Al atoms, P atoms, and O atoms. The pore diameter is 0.30×0.55 nm. As described previously, various materials can be adopted as the material for the support 11, but since the SAT-type zeolite is an AlPO-based zeolite, the support 11 is preferably an alumina sintered compact or a mullite sintered compact.

The zeolite membrane 12 is oriented, and in an X-ray diffraction pattern obtained by X-ray irradiation to the zeolite membrane 12, the peak intensity around $2\theta=13.9°$ is 1.5 times or more the peak intensity around $2\theta=8.5°$. In the X-ray diffraction pattern, more preferably, the peak intensity around $2\theta=13.9°$ is two times or more the peak intensity around $2\theta=8.5°$. For the comparison between the peak intensity around $2\theta=13.9°$ and the peak intensity around $2\theta=8.5°$, the baseline of the X-ray diffraction pattern, i.e., the height excluding background noise components, is used. The X-ray diffraction pattern is obtained by irradiation of CuKα-rays to the membrane surface of the zeolite membrane 12 using an X-ray diffractometer (MiniFlex600 manufactured by Rigaku Corporation) under conditions including an X-ray output of 600 W (tube voltage of 40 kV and tube current of 15 mA), a scanning speed of 0.5°/min, a scanning step of 0.02°, and a CuKβ-ray filter formed of a 0.015 mm-thick Ni foil.

It is known that the peak intensity around $2\theta=13.9°$ indicates the degree of orientation in which the (110) plane that is the aperture plane of a microspore is oriented toward the membrane surface, and it can be seen from the X-ray diffraction pattern having the aforementioned feature that most of the aperture planes of microspores in zeolite crystals are oriented toward the membrane surface. That is, the planes along the apertures and the membrane surface are almost parallel. Accordingly, the zeolite membrane 12 is adequate for utilization in which membranes permeate molecules. The zeolite membrane complex 1 is particularly adequate for gas separation, but can also achieve high performance in various other applications because of the above orientation. With the above orientation, a high binding property is provided between crystals, and accordingly, the zeolite membrane has high denseness and high separation performance.

Figure 2:
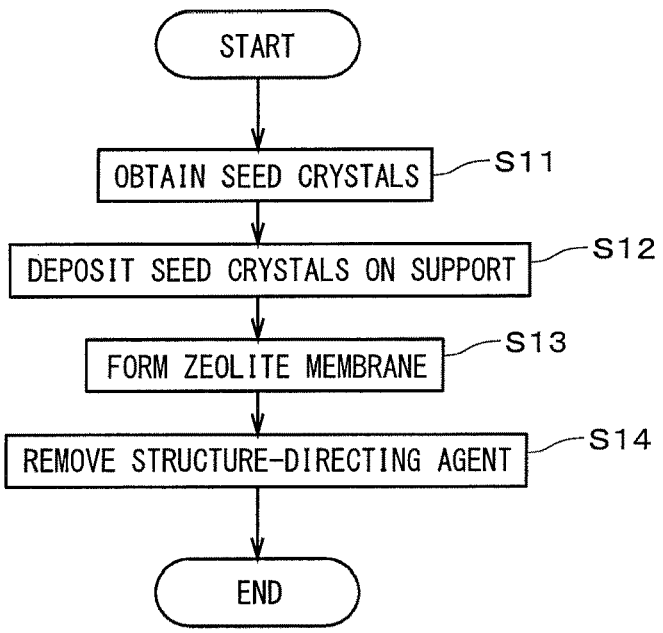
FIG. 2 illustrates a flow of production of the zeolite membrane complex.

FIG. 2 illustrates a flow of production of the zeolite membrane complex 1. First, SAT-type zeolite powder is synthesized by hydrothermal synthesis. The zeolite powder may be used as-is as seed crystals, or the seed crystals may be obtained by processing the zeolite powder by pulverization or other similar methods (step S11). Next, a porous support is immersed in a solution in which the seed crystals are dispersed, so that the seed crystals are deposited on the support (step S12). Other methods may be used to deposit the seed crystals on the support.

The support is immersed in a starting material solution, and a zeolite membrane is formed on the support by growing an SAT-type zeolite by hydrothermal synthesis using the seed crystals as nuclei (step S13). The temperature of the hydrothermal synthesis is preferably in the range of 130 to 200° C. At this time, an oriented SAT-type zeolite membrane is obtained by adjusting, for example, the compounding ratio of a phosphorus source and a structure-directing agent (hereinafter also referred to as an "SDA") in the starting material solution. The pH of the starting material solution may be adjusted by other methods. Ultimately, the SDA in the zeolite membrane is decomposed and removed by heating (step S14). In step S14, the SDA in the zeolite membrane may be removed completely, or may be left in part.

The starting material solution used in step S13 is specifically obtained by mixing an aluminum source and a phosphorus source with a pH greater than or equal to 4 and making the ultimate pH greater than or equal to 5 and less than or equal to 9. Accordingly, an oriented SAT-type zeolite membrane is obtained. In other words, at least at the stage of making a mixed solution containing an aluminum source and a phosphorus source, the pH is greater than or equal to 4. Then, preferably, the pH is maintained at 4 or above until the making of the starting material solution is completed, and ultimately the starting material solution with a pH greater than or equal to 5 and less than or equal 9 is obtained.

Unlike conventional techniques for making SAT-type zeolite powder, if the pH of the starting material solution is too high when the SAT-type zeolite membrane is grown in step S13 described above, it is difficult to reliably grow the zeolite membrane; and if the pH is too low, it is difficult to suppress the formation of by-product phases other than the SAT-type zeolite. Moreover, if the pH is too low when the aluminum source and the phosphorus source are mixed, the starting material solution will easily become nonuniform, and the growth of the oriented membrane in step S13 described above becomes difficult. In the present embodiment, it is possible to efficiently grow a zeolite membrane by adjusting a mixture ratio of starting materials in the starting material solution so that the aluminum source and the phosphorus source are mixed with a pH greater than or equal to 4 and the starting material solution has a pH greater than or equal to 5 and less than or equal to 9. Besides, with this pH adjustment, an oriented SAT-type zeolite membrane can be obtained.

For the synthesis of the SAT-type zeolite powder or membrane, for example, aluminum alkoxide such as aluminum isopropoxide, aluminum hydroxide, sodium aluminate, or an alumina sol can be used as the aluminum source, and for example, a phosphoric acid, diphosphorus pentaoxide, sodium dihydrogen phosphate, ammonium dihydrogen phosphate, or phosphoric ester can be used as the phosphorus source.

Next, the separation of a mixture of substances using the zeolite membrane complex 1 will be described with reference to FIG. 3.

Figure 3:
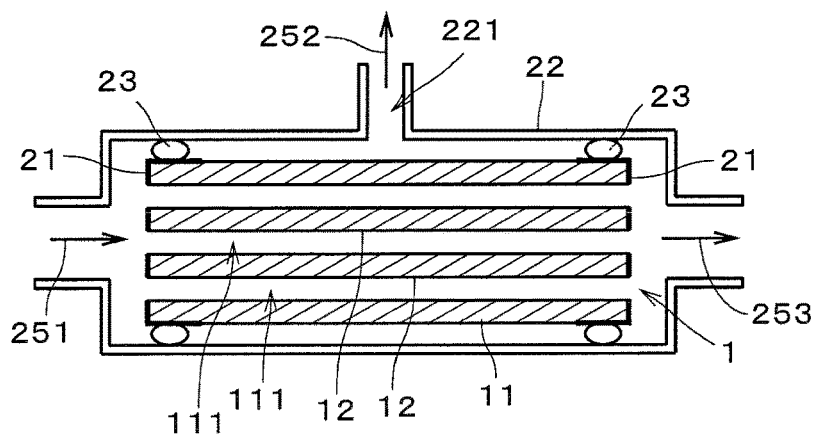
FIG. 3 illustrates an apparatus for separating a mixed gas.

In FIG. 3, the zeolite membrane 12 is formed on the inner surfaces of through holes 111 of the support 11. The opposite ends of the support 11 are sealed by sealers 21, and the support 11 is encased in an outer cylinder 22. That is, the zeolite membrane complex 1 is disposed in the outer cylinder 22. The sealers 21 are members that are mounted on the opposite ends of the support 11 of the zeolite membrane complex 1 in the longitudinal direction and cover and seal the opposite end faces of the support 11 in the longitudinal direction. The sealers 21 are, for example, plate-like members formed of glass. The material and shape of the sealers 21 may be appropriately changed. Moreover, seal members 23 are disposed between the outer cylinder and opposite end portions of the support 11. The seal members 23 are disposed along the entire periphery between the outer side face of the zeolite membrane complex 1 (i.e., the outer side face of the support 11) and the inner side face of the outer cylinder 22 in the vicinity of the opposite end portions of the zeolite membrane complex 1 in the longitudinal direction. The seal members 23 are substantially circular-ring shaped members formed of a material impermeable to gases. For example, the seal members 23 are O-rings formed of a resin having flexibility. The seal members 23 are in intimate contact with the outer side face of the zeolite membrane complex 1 and the inner side face of the outer cylinder 22 along the entire periphery. The space between the seal members 23 and the outer side face of the zeolite membrane complex 1 and the space between the seal member 23 and the inner side face of the outer cylinder 22 are sealed so as to disable the passage of gases.

In this state, a mixture of substances containing a plurality of types of fluids (i.e., gases or liquids) is introduced into the through holes 111 of the support 11 as indicated by an arrow 251, and substances that have passed through the zeolite membrane 12 are collected from a hole 221 provided in the outer cylinder 22 as indicated by an arrow 252, so that substances with high permeability in the mixture of substances are separated from the other substances. For example, the separation may be performed for the purpose of extracting substances with high permeability from the mixture of substances or for the purpose of concentrating substances with low permeability.

As described above, the mixture of substances (i.e., mixed fluid) may be a mixed gas containing a plurality of types of gases, or a mixed solution containing a plurality of types of liquids, or a gas-liquid two-phase fluid containing both gas and liquid.

The mixture of substances includes, for example, one or more types of substances including hydrogen ($H_2$), helium (He), nitrogen ($N_2$), oxygen ($O_2$), water ($H_2O$), steam ($H_2O$), carbon monoxide (CO), carbon dioxide ($CO_2$), nitrogen oxides, ammonia ($NH_3$), sulfur oxides, hydrogen sulfide ($H_2S$), sulfur fluorides, mercury (Hg), arsine ($AsH_3$), hydrogen cyanide (HCN), carbonyl sulfide (COS), C1 to C8 hydrocarbons, organic acids, alcohol, mercaptans, ester, ether, ketone, and aldehyde.

Nitrogen oxides are compounds of nitrogen and oxygen. The aforementioned nitrogen oxides are, for example, gases called $NO_x$ such as nitrogen monoxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), and dinitrogen pentoxide ($N_2O_5$).

Sulfur oxides are compounds of sulfur and oxygen. The aforementioned sulfur oxides are, for example, gases called $SO_x$ such as sulfur dioxide ($SO_2$) and sulfur trioxide ($SO_3$).

Sulfur fluorides are compounds of fluorine and sulfur. Examples of the aforementioned sulfur fluorides include disulfur difluoride (F—S—S—F, $S=SF_2$), sulfur difluoride ($SF_2$), sulfur tetrafluoride ($SF_4$), sulfur hexafluoride ($SF_6$), and disulfur decafluoride ($S_2F_{10}$).

C1 to C8 hydrocarbons are hydrocarbons containing one to eight carbon atoms. C3 to C8 hydrocarbons may be any of a linear-chain compound, a side-chain compound, and a cyclic compound. C3 to C8 hydrocarbons may also be either saturated hydrocarbons (i.e., the absence of double bonds and triple bonds in molecules) or unsaturated hydrocarbons (i.e., the presence of double bonds and/or triple bonds in molecules). Examples of C1 to C4 hydrocarbons include methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2=CHCH_2CH_3$), 2-butene ($CH_3CH=CHCH_3$), and isobutene ($CH_2=C(CH_3)_2$).

The aforementioned organic acids are, for example, carboxylic acid or sulfonic acid. Examples of the carboxylic acid include formic acid ($CH_2O_2$), acetic acid ($C_2H_4O_2$), oxalic acid ($C_2H_2O_4$), acrylic acid ($C_3H_4O_2$), and benzoic acid ($C_6H_5COOH$). The sulfonic acids are, for example, ethane sulfonic acid ($C_2H_6O_3S$) and so on. The organic acids may be either chain compounds or cyclic compounds.

Examples of the aforementioned alcohol include methanol ($CH_3OH$), ethanol ($C_2H_5OH$), isopropanol (2-propanol) ($CH_3CH(OH)CH_3$), ethylene glycol ($CH_2(OH)CH_2(OH)$), and butanol ($C_4H_9OH$).

The mercaptans are organic compounds with hydrogenerated sulfur (SH) at their terminals and are substances called also thiol or thioalcohol. Examples of the aforementioned mercaptans include methyl mercaptan ($CH_3SH$), ethyl mercaptan ($C_2H_5SH$), and 1-propane thiol ($C_3H_7SH$).

Examples of the aforementioned ester include formic acid ester and acetic acid ester.

Examples of the aforementioned ether include dimethyl ether (($CH_3)_2O$), methyl ethyl ether ($C_2H_5OCH_3$), and diethyl ether (($C_2H_5)_2O$).

Examples of the aforementioned ketone include acetone (($CH_3)_2CO$), methyl ethyl ketone ($C_2H_5COCH_3$), and diethyl ketone (($C_2H_5)_2CO$).

Examples of the aforementioned aldehyde include acetaldehyde ($CH_3CHO$), propionaldehyde ($C_2H_5CHO$), and butanal (butyraldehyde) ($C_3H_7CHO$).

The following description takes the example of the case where the aforementioned mixture of substances is a mixed gas including a plurality of types of gases.

As indicated by the arrow 251, the pressure (i.e., initial pressure) of the mixed gas supplied to the internal space of the outer casing 22 is in the range of, for example, 0.1 MPa to 10.0 MPa. The pressure (i.e., permeation pressure) of the mixed gas collected from the hole 221 provided in the outer cylinder 22 as indicated by the arrow 252 is, for example, atmospheric pressure. The pressure of the mixed gas that does not pass through the zeolite membrane 12 and is exhausted out of the outer cylinder 22 (i.e., non-permeation pressure) is, for example, equivalent to the initial pressure. The temperature of separating the mixed gas is, for example, in the range of 10° C. to 200° C.

As indicated by the arrow 251, the mixed gas supplied to the outer cylinder 22 is introduced into each through hole 111 of the support 11 from the left side of the zeolite membrane complex 1 in the drawing. Gases with high permeability (e.g., $CO_2$; hereinafter referred to as a "high-permeability substance") in the mixed gas pass through the zeolite membrane 12 provided on the inner side face of each through hole 111 and through the support 11 and are discharged from the outer side face of the support 11. In this way, high-permeability substances are separated from gases with low permeability (e.g., $CH_4$; hereinafter referred to as "low-permeability substance") in the mixed gas. The gases (i.e., high-permeability substances) discharged from the outer side face of the support 11 are collected from the hole 221 provided in the outer cylinder 22 as indicated by the arrow 252.

In the mixed gas, gases (hereinafter, referred to as "impermeable substances") other than gases that have passed through the zeolite membrane 12 and the support 11 pass through each through hole 111 of the support 11 from the left side to the right side in the drawing and are exhausted out of the outer cylinder 22 as indicated by an arrow 253. The impermeable substances may include high-permeability substances that did not pass through the zeolite membrane 12, in addition to the aforementioned low-permeability substances.

Next, one example of the production of the zeolite membrane complex will be described.

Preparation of Seed Crystals

A starting material solution with a composition of $1Al_2O_3:1P_2O_5:0.8SDA:200H_2O$ was prepared by dissolving aluminum isopropoxide, 85% phosphoric acid, and 1,4-diazabicyclo[2,2,2]octane-C4-diquat hydroxide respectively as the aluminum source, the phosphorus source, and the SDA (structure-directing agent) in deionized water. This starting material solution was subjected to hydrothermal synthesis at 190° C. for 50 hours. Crystals obtained by the hydrothermal synthesis were collected, cleaned enough in deionized water, and then completely dried at 100° C. As a result of X-ray diffraction measurement, the resultant crystals were SAT-type zeolite crystals. These crystals were poured in deionized water so as to have a mass percent of 10 to 20 and pulverized for 7 days with a ball mill into seed crystals.

Preparation of Oriented SAT Membrane

A porous alumina support having a monolith shape was brought into contact with a solution in which the aforementioned seed crystals were dispersed, in order to apply the seed crystals into cells that are through holes of a support. Thereafter, a starting material solution with a composition of $1Al_2O_3:2P_2O_5:2.3SDA:1000H_2O$ was prepared by dissolving aluminum isopropoxide, 85% phosphoric acid, and 1,4-diazabicyclo[2,2,2]otane-C4-diquat hydroxide respectively as the aluminum source, the phosphorus source, and the SDA in deionized water. The starting material solution for zeolite membrane was prepared such that the aluminum source and the phosphorus source were mixed with a pH greater than or equal to 4 and aluminum was distributed in the starting material solution. The starting material solution had a pH of 7.

The support with the seed crystals applied was immersed in this solution and subjected to hydrothermal synthesis at 170° C. for 50 hours. After the hydrothermal synthesis, the support was washed enough with deionized water and then completely dried at 100° C. The $N_2$ permeance of the SAT-type zeolite membrane, measured after the drying, was less than or equal to $0.005$ $nmol/m^2 \cdot s \cdot Pa$. This confirmed that the zeolite membrane had an applicable degree of denseness. The zeolite membrane was subjected to heat treatment at 500° C. for 20 hours so as to burn and remove the SDA and cause microspores in the zeolite membrane to come through the membrane.

Gas Separation Test

Next, a mixed-gas separation test was conducted using an apparatus having a schematic structure illustrated in FIG. 3. In FIG. 3, the zeolite membrane 12 was formed on the inner surfaces of the through holes 111 of the support 11. The each ends of the support 11 were sealed by the glass 21, and the support 11 was encased in the outer cylinder 22. In this state, a mixed gas was introduced into the through holes 111 of the support 11 as indicated by the arrow 251, and gases that had passed through the zeolite membrane 12 were collected from the hole 221 provided in the outer cylinder 22 as indicated by the arrow 252.

A gas supply pressure in the separation test was 0.2 MPaG, and a gas with a $CO_2/CH_4$ ratio of 50:50 was used as the mixed gas. As a result, the $CO_2/CH_4$ permeance ratio was 1810. This confirmed that the SAT-type zeolite membrane had sufficiently applicable separation performance. In an X-ray diffraction pattern obtained by X-ray irradiation to the surface of the SAT-type zeolite membrane, the peak intensity around $2\theta=13.9°$ was 2.2 times the peak intensity around $2\theta=8.5°$.

In the case where the SAT-type zeolite membrane was prepared using a starting material solution made by adjusting the mixture ratio of starting materials so as to have a pH of 5 to 9 while mixing the aluminum source and the phosphorus source with a pH greater than or equal to 4, in the X-ray diffraction pattern obtained by X-ray irradiation to the surface of the SAT-type zeolite membrane, the peak intensity around $2\theta=13.9°$ was 1.5 times or more the peak intensity around $2\theta=8.5°$. The improvement in separation performance, achieved by the orientation toward the (110) plane, was configured by these membranes.

In the case where, as a comparative example, a starting material solution was prepared under conditions described above in Non-Patent Document 1, the pH during the mixing of the aluminum source and the phosphorus source was 3, and the starting material solution had a pH of 7. In an X-ray diffraction pattern of an SAT-type zeolite membrane prepared using this starting material solution, the peak intensity around $2\theta=13.9°$ was 1.1 times the peak intensity around $2\theta=8.5°$. That is, in this case, the SAT-type zeolite membrane was not oriented. Also, in the case where the starting material solution was made to have a pH of 10 by changing the mixture ratio of starting materials and the synthesis of the SAT-type zeolite membrane was conducted, the SAT-type zeolite membrane was not formed on the support. In this way, the zeolite membrane complex according to the present invention is a new zeolite membrane complex having an SAT-type oriented zeolite membrane.

VARIATIONS

The zeolite membrane complex and the production thereof described above can be modified in various ways.

Instead of aluminum isopropoxide, any other material that belongs to aluminum alkoxide or alumina sols may be used as the aluminum source in the starting material solution. Aluminum alkoxide or alumina sols are materials that are newly used in the synthesis of SAT-type zeolites. Aluminum alkoxide or alumina sols may be used only in synthesizing the seed crystals, or may be used only in synthesizing the zeolite membrane.

The SAT-type zeolite membrane does not necessarily have to be purely composed of aluminum phosphate, and may contain other elements. For example, the SAT-type zeolite membrane may contain Mg atoms or Si atoms.

The zeolite membrane complex 1 may further include a functional membrane and a protective membrane that are laminated on the zeolite membrane 12. Such functional and protective membranes are not limited to zeolite membranes, and may be inorganic membranes such as carbon membranes or silica membranes, or may be organic membranes such as polyimide membranes or silicone membranes.

The configurations according to the embodiments and variations described above may be appropriately combined as long as there are no mutual inconsistencies.

INDUSTRIAL APPLICABILITY

The zeolite membrane complex according to the present invention can be used as, for example, a gas separation membrane, and can also be used in various fields using zeolite, for example, as a separation membrane for substances other than gases or as an adsorption membrane for various substances.

REFERENCE SIGNS LIST

1 Zeolite membrane complex
11 Support
12 Zeolite membrane
S11 to S14 Step

The invention claimed is:

1. A zeolite membrane complex comprising:
a support; and
a zeolite membrane formed on said support,
wherein said zeolite membrane is of SAT-type zeolite, and
in an X-ray diffraction pattern obtained by X-ray irradiation to said zeolite membrane, a peak intensity around $2\theta=13.9°$ is 1.5 times or more a peak intensity around $2\theta=8.5°$.

2. The zeolite membrane complex according to claim 1, wherein
in said X-ray diffraction pattern, the peak intensity around $2\theta=13.9°$ is two times or more the peak intensity around $2\theta=8.5°$.

3. The zeolite membrane complex according to claim 1, wherein said support is porous.

4. The zeolite membrane complex according to claim 1, wherein said support is an alumina sintered compact or a mullite sintered compact.

5. A method of producing a zeolite membrane complex, comprising:
a) synthesizing SAT-type zeolite by hydrothermal synthesis and obtaining seed crystals from said zeolite;
b) depositing said seed crystals on a support;
c) immersing said support in a starting material solution having a pH greater than or equal to 5 and less than or equal to 9 prepared by mixing an aluminum source and a phosphorus source while maintaining a pH greater than or equal to 4 at all times after mixing the aluminum source and phosphorous source, and growing SAT-type zeolite from said seed crystals by hydrothermal synthesis to form a zeolite membrane on said support; and
d) removing a structure-directing agent from said zeolite membrane.

6. The method of producing a zeolite membrane complex, according to claim 5, wherein
in an X-ray diffraction pattern obtained by X-ray irradiation to said zeolite membrane, a peak intensity around $2\theta=13.9°$ is 1.5 times or more a peak intensity around $2\theta=8.5°$.

7. The method of producing a zeolite membrane complex, according to claim 5, wherein
in said operation a) or c), aluminum alkoxide or an alumina sol is used as the aluminum source in the hydrothermal synthesis.

* * * * *